Aug. 28, 1934.  P. L. COHEN  1,971,903
DEVICE FOR BAKING BREAD AND METHOD OF EMPLOYING SAME
Filed Aug. 28, 1933
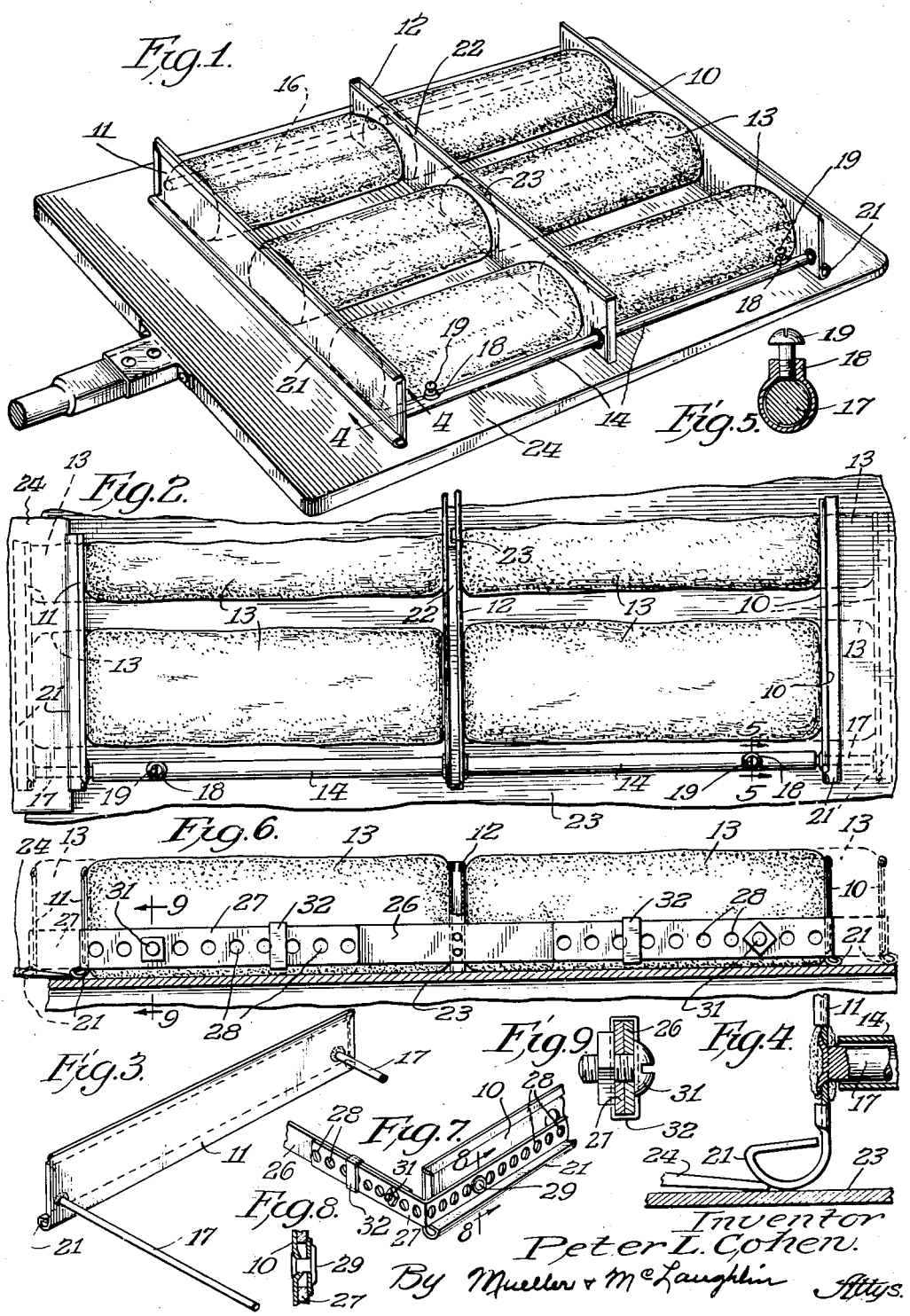
Inventor
Peter L. Cohen.
By Mueller & McLaughlin Attys.

Patented Aug. 28, 1934

1,971,903

UNITED STATES PATENT OFFICE 1,971,903

DEVICE FOR BAKING BREAD AND METHOD OF EMPLOYING SAME

Peter L. Cohen, Chicago, Ill.

Application August 28, 1933, Serial No. 687,087

4 Claims. (Cl. 53—6)

My invention relates to the baking of bread. It relates more in particular to the method of and apparatus employed in the baking of certain types of loaves such as the so-called old-fashioned rye bread.

Certain problems are found in baking certain types of bread such as rye bread, Vienna bread, French bread, and other breads which are customarily baked directly upon the hearth of an oven. In the old practice, this type of bread was produced by forming the dough into the general shape of a loaf, proofing it, and then placing it directly upon the hearth of the oven in contact with the bricks or other surface employed therein, without the use of any type of baking pan or the like. This method has certain disadvantages, principally in that the bread cannot be held in definite shape. The ends of the loaf particularly, due to gravitation of flow, become quite extremely pointed and as a result in a loaf of bread of ordinary length only a very few slices cut from the loaf will have substantially the same size. The ends are very narrow and the center is relatively thick. This produces two problems. When the bread is employed for sandwiches, as, for example, in restaurants, there is considerable waste because the ends cannot be used. Furthermore, in recent years there have been demands for ready sliced bread, the bread being delivered to the consumer wrapped in a waterproof package and already sliced. The usual slicing and wrapping machines cannot handle the ordinary old-fashioned rye loaf in the way that they handle the conventional white loaf. In an attempt to remedy this disadvantage, bakers have employed conventional types of baking pans for baking rye bread. I have found, however, that rye bread baked in a pan which surrounds it on five surfaces does not have the desirable rye flavor. The crust particularly is of a different character and is not so tasty to those who have learned to appreciate old-fashioned rye bread.

Accordingly, the principal object of my invention is to produce a loaf of rye bread which will have all of the advantages of the old-fashioned rye bread and can still be handled and used according to accepted modern practice.

Another object is the production of a loaf of rye bread having substantially the same cross-section from end to end.

Another object is the production of a loaf of rye bread which can be sliced and packaged on the usual machinery with which present bake shops are equipped.

Another object is the provision of a device adapted for use in the production of a loaf of rye bread of the character described.

Another object is the provision of such a device which will be adjustable for different sizes of loaves.

Other objects and features of the invention will be apparent from a consideration of the following detailed description taken with the accompanying drawing, wherein Fig. 1 is a perspective view showing the device employed in my invention with the bread supported therein on a proofing peel;

Fig. 2 is a fragmentary plan view showing the manner in which the device and bread are placed in the oven;

Fig. 3 is a perspective view showing a part of the device;

Fig. 4 is a fragmentary enlarged sectional view taken on the line 4—4 of Fig. 1, looking in the direction of the arrows;

Fig. 5 is an enlarged transverse sectional view taken on the line 5—5 of Fig. 2 showing a detail of the device;

Fig. 6 is a fragmentary elevational view partly in section showing a modification;

Fig. 7 is a fragmentary perspective view showing a feature of the modification;

Fig. 8 is an enlarged fragmentary sectional view taken on the line 8—8 of Fig. 7; and Fig. 9 is a sectional view taken on the line 9—9 of Fig. 6.

When I describe the present invention as applying to rye bread, it is obvious that it may be employed in the baking of any type of bread which is customarily baked directly upon the hearth of an oven. For this reason, wherever I refer to rye bread, therefore, it is in a broad sense to include this type of loaf.

In carrying out my invention, I employ an improved device of my construction adapted to engage the ends of the loaf but not any other portion thereof. This device is adjustable to produce loaves of any ordinary length required. The bread is formed in loaves set within the device so that the ends of the loaves will engage the device, the device as well as the loaves being placed on a proofing peel and set into a proofing room to allow the loaves to rise. The peel is then employed to insert the unbaked loaves and the device together into the oven, so that the loaves and device both rest directly upon the hearth of the oven. The loaves are baked then in the ordinary way and at the usual temperatures, and, when baked, the peel is then employed to remove the entire assembly from the oven.

Now referring to the device itself, it comprises end forming rails 10 and 11 with a double center forming rail 12, specially designed to secure results to be described. The loaves of bread 13 are disposed longitudinally of the device and abut the rails 11, 12 and 10 so that their ends, as shown, are flat and the loaves have substantially the same cross-section from end to end. These forming rails are adjustably secured together by means of hollow rods 14 and 16 which extend through the center rail 12 and are secured thereto by suitable means such as welding. Solid rods 17 have their ends secured to the end forming rails 10 and 11 and project into the hollow rods 14 and 16. The hollow rods near their ends are provided with bosses 18 (see Fig. 5) into which screws 19 are threaded so as to engage solid rods and position them with respect to the hollow rods. In this way, each of the end rails 10 and 11 is adjustable with respect to the center rail 12, and so they can be adjusted for different lengths of loaves. It will be understood that the securing means may be modified so as either to project downwardly from the rods or sideways therefrom as appears most convenient. However, the position shown affords a ready means of access. It will be understood also that the screw 19 may have any type of engaging head adapted to be engaged by any suitable tool or fingers.

The forming rails are formed of a relatively thin material having a high co-efficient of heat conductivity, and they are finished with a bright, smooth, non-corroding surface. Relatively thin alloy sheet steel is suitable for the purpose, such as stainless steel having a relatively large amount of chromium alloyed with it, or the sheet may be plated or coated with a non-corrosive material such as chromium, nickel or the like. However, I may use ordinary sheet steel with good results.

The top and side edges of the forming rails are treated to avoid the presence of a sharp edge. They may be flanged over as shown or formed in any suitable manner to secure this effect, while leaving the surface with which the bread comes in contact perfectly smooth. A bead 21 is formed continuously along the bottom edge of both of the end forming rails and this bead is finished with an arcuate bottom surface so that the peel is readily inserted thereunder, as shown in Fig. 4.

The center forming rail, as shown, has a double thickness with an open space 22 between the two portions, a parting strip 23 being provided in the center for positively maintaining the two portions of the rails separated. I find this is an important feature because if a solid center rail is used there will not be sufficient heat conducted to the ends of the loaves to produce a sufficiently brown crust. The end rails 10 and 11 being relatively thin will, in the form shown, produce a brown well-baked end crust or heel on the loaf.

In Figs. 2 and 4, I indicate the oven hearth 23 as a continuous member. It will be understood that this is more or less a schematic showing, as the oven hearth may be brick laid in in the usual manner, a continuous refractory material, or any surface or material used in ovens for the hearth surface.

Fig. 1 indicates an early step in the process with the forming device and bread supported on a proofing peel 24. Those skilled in the art understand that a suitable "dusting flour" such as corn meal will first be sprinkled over the peel 24 before the loaves are placed on it. The entire assembly, as shown in Fig. 1, is then placed in a proofing room until the loaves are ready to be placed in the oven. The whole assembly is then placed in the oven and the proofing peel withdrawn. When the bread has been baked, a peel is again inserted under the entire assembly, including the forming device and baked loaves, and they are withdrawn from the oven together. Sometimes loaves baked in this way are "cut" by the baker; that is, just before they are placed in the oven, a knife is drawn lightly across the top of the loaf at a suitable place and in a suitable direction so that in baking, the escape of gas will be controlled, and the development of the loaf will be improved. An advantage of my invention is that the use of the forming device will in no way interfere with treatment of the loaves by cutting or the like.

In the modification shown in Figs. 6 to 9, inclusive, I employ forming baffles similar to the forming baffles shown in the first embodiment. To adjust and support the forming baffles, however, I employ a strap 26 welded to the center forming baffle as shown in Fig. 6. The opposite end of this center forming baffle has a similar strap 26 (not shown) connected to it. Around each of the end baffles I provide a strap 27 provided with a number of perforations 28. These straps are riveted to the forming baffles 10 and 11 by rivets 29 (Fig. 8). These straps 27 project at right angles to the forming baffles at both sides thereof and are adapted to engage with the straps 27 which project on both sides of the forming baffle 12. The straps 26 are provided with holes adapted to register with any one of the holes 28, and nuts and bolts 31 (Fig. 9) are provided for securing the strips together and maintaining the baking device in assembled relationship. Collars 32 slidable on the straps are employed in the manner of keepers to prevent the projecting portions of the straps 27 from separating too far from the straps 26. It is obvious that in the modification described, the same general principles employed in the first embodiment are used.

I have described my invention in detail so that those skilled in the art will understand how to practice the same. My invention is limited, however, only by the scope of the appended claims.

What I claim as new and desire to protect by Letters Patent of the United States is:

1. A baking device of the character described comprising a center rail and a pair of end rails formed of relatively thin heat conducting material, a pair of rods extending through the center rail and secured integral thereto, a pair of rods connected to each of the end rails, and means for adjustably attaching said second mentioned rods to the first mentioned rods whereby all of said forming rails are maintained parallel and each of the end rails may be adjusted with respect to the center rail.

2. A baking device of the character described comprising a center rail and a pair of end rails formed of relatively thin heat conducting material, a pair of rods extending through the center rail and secured integral thereto, a pair of rods connected to each of the end rails, and means for adjustably attaching said second mentioned rods to the first mentioned rods whereby all of said forming rails are maintained parallel and each of the end rails may be adjusted with respect to the center rail, said center rail being formed double and having an open air space between portions thereof.

3. A baking device of the character described, comprising a center rail and a pair of end rails formed of relatively thin heat conducting material, a pair of rods extending through the center rail and secured integral thereto, a pair of rods connected to each of the end rails, and means for adjustably attaching said second mentioned rods to the first mentioned rods whereby all of said forming rails are maintained parallel and each of the end rails may be adjusted with respect to the center rail, said end rails having beads along their bottom edges whereby to permit insertion of a peel under the entire device.

4. A baking device of the character described comprising a center forming rail having a pair of relatively thin heat conducting partitions with air space between them, means for maintaining said partitions spaced but parallel to each other, a pair of hollow rods projecting through said two partitions near the ends thereof and secured thereto, a pair of end rails formed of heat conducting material and having bottom edges beaded to permit insertion of a peel thereunder, a pair of solid rods secured to each of the end rails and projecting into the ends of the two hollow rods, and securing means at each end of each of the hollow rods adapted to engage the solid rods to maintain the positions of the end rails with respect to the center rails.

PETER L. COHEN.